United States Patent
Drack et al.

(10) Patent No.: US 9,593,670 B2
(45) Date of Patent: Mar. 14, 2017

(54) SYSTEM AND METHODS FOR REDUCING WIND TURBINE NOISE

(71) Applicant: General Electric Company, Schenectady, NY (US)

(72) Inventors: Lorenz Edwin Drack, Bavaria (DE); Benoit Philippe Petitjean, Bavaria (DE); Jorge Alejandro Carretero Benignos, Bavaria (DE); Akil Abbas Rangwalla, Fountain Inn, SC (US); Pratish Patil, Bangalore (IN)

(73) Assignee: General Electric Company, Niskayuna, NY (US)

( * ) Notice: Subject to any disclaimer, the term of this patent is extended or adjusted under 35 U.S.C. 154(b) by 353 days.

(21) Appl. No.: 14/266,108

(22) Filed: Apr. 30, 2014

(65) Prior Publication Data
US 2015/0316032 A1    Nov. 5, 2015

(51) Int. Cl.
*F03D 7/02* (2006.01)

(52) U.S. Cl.
CPC ........ *F03D 7/0296* (2013.01); *F05B 2260/96* (2013.01); *F05B 2270/303* (2013.01); *Y02E 10/723* (2013.01)

(58) Field of Classification Search
CPC ............... F03D 7/0296; F05B 2260/96; F05B 2270/303; Y02E 10/723
USPC ........................... 416/37, 39, 95, 96 R, 96 A
See application file for complete search history.

(56) References Cited

U.S. PATENT DOCUMENTS

| | | | | |
|---|---|---|---|---|
| 2,690,890 A | * | 10/1954 | Weeks | B64D 15/14 219/202 |
| 2,695,146 A | * | 11/1954 | De Witt | B64D 15/12 219/201 |
| 2,742,248 A | * | 4/1956 | Le Compte | B64D 15/12 219/201 |
| 3,109,913 A | * | 11/1963 | Galajda, Jr. | B01F 15/068 219/209 |

(Continued)

FOREIGN PATENT DOCUMENTS

| | | |
|---|---|---|
| CA | 2150628 A1 | 12/1995 |
| EP | 0589728 A1 | 3/1994 |

(Continued)

OTHER PUBLICATIONS

Wind Turbine Ice Protection System (WTIPS), product information, retrieved from website URL http://www.kellyaerospace.com/wind_turbine_deice.html (2 pgs.).

(Continued)

*Primary Examiner* — William McCalister
(74) *Attorney, Agent, or Firm* — Ann M. Agosti (57) ABSTRACT

A method for reducing noise generated by a wind turbine includes measuring a reference temperature of the wind turbine. The method also includes regulating a trailing edge surface temperature of a trailing edge portion of a rotor blade attached to the wind turbine. In addition, the method includes measuring the trailing edge surface temperature. Further, the method includes regulating the trailing edge surface temperature to maintain a predetermined temperature differential between the reference temperature and the trailing edge surface temperature.

20 Claims, 5 Drawing Sheets

(56) References Cited

U.S. PATENT DOCUMENTS

| | | | |
|---|---|---|---|
| 4,786,020 A * | 11/1988 | Franke | B64C 23/00 244/130 |
| 4,932,610 A | 6/1990 | Maestrello | |
| 4,993,593 A * | 2/1991 | Fabiano | A47J 36/16 219/442 |
| 5,230,606 A * | 7/1993 | Chin-Fu | F04D 29/582 392/362 |
| 5,320,309 A | 6/1994 | Nosenchuck et al. | |
| 5,341,677 A | 8/1994 | Maris | |
| 5,368,384 A * | 11/1994 | Duncan | A47J 43/044 219/227 |
| 5,595,205 A | 1/1997 | Sirovich et al. | |
| 5,934,617 A * | 8/1999 | Rutherford | B64D 15/14 244/134 D |
| 6,065,334 A | 5/2000 | Corten | |
| 6,419,447 B1 * | 7/2002 | Watanabe | F01D 5/147 415/115 |
| 6,474,935 B1 | 11/2002 | Crotty et al. | |
| 7,331,760 B2 * | 2/2008 | Furuta | F01P 7/048 123/41.12 |
| 7,845,236 B2 | 12/2010 | Zheng et al. | |
| 8,152,440 B2 | 4/2012 | Zheng et al. | |
| 8,185,291 B2 | 5/2012 | Nakakita et al. | |
| 8,408,871 B2 | 4/2013 | Herr et al. | |
| 8,595,283 B2 | 11/2013 | Inkinen et al. | |
| 8,657,238 B2 | 2/2014 | Fox et al. | |
| 2003/0031555 A1 * | 2/2003 | Noe | F01D 5/189 415/115 |
| 2007/0147996 A1 * | 6/2007 | Campbell | F01D 5/08 416/95 |
| 2008/0298964 A1 * | 12/2008 | Rimmen | F03D 9/002 416/39 |
| 2009/0097976 A1 * | 4/2009 | Driver | F03D 7/022 416/42 |
| 2009/0280011 A1 * | 11/2009 | Tibbott | F01D 5/081 416/95 |
| 2010/0284785 A1 | 11/2010 | Wadia et al. | |
| 2011/0246094 A1 | 10/2011 | Olesen | |
| 2012/0195758 A1 * | 8/2012 | Are | F01D 5/066 416/95 |
| 2012/0231405 A1 * | 9/2012 | Dreher | F03D 11/02 432/9 |
| 2013/0177416 A1 * | 7/2013 | Renschler | F03D 11/0025 416/1 |
| 2013/0193756 A1 | 8/2013 | Fukaya | |
| 2013/0194729 A1 | 8/2013 | Joe et al. | |
| 2013/0200843 A1 | 8/2013 | Tanabe | |
| 2013/0217246 A1 | 8/2013 | Hankey et al. | |
| 2013/0249479 A1 | 9/2013 | Partovi | |
| 2013/0260677 A1 | 10/2013 | Partovi | |
| 2013/0277455 A1 | 10/2013 | Thompson et al. | |
| 2013/0314303 A1 | 11/2013 | Osterhout et al. | |
| 2013/0335003 A1 | 12/2013 | Buhler et al. | |
| 2013/0335914 A1 | 12/2013 | Lee | |
| 2013/0341406 A1 | 12/2013 | Tamburrini et al. | |
| 2013/0346661 A1 | 12/2013 | Hasenei | |
| 2014/0008093 A1 | 1/2014 | Patel et al. | |
| 2014/0035527 A1 | 2/2014 | Hayashigawa et al. | |
| 2014/0248123 A1 * | 9/2014 | Turner | F03D 7/0292 415/1 |
| 2014/0308129 A1 * | 10/2014 | Funabashi | F03D 80/00 416/95 |
| 2015/0023792 A1 * | 1/2015 | Spitzner | F03D 11/0025 416/1 |
| 2015/0211572 A1 * | 7/2015 | Casazza | F03D 7/00 290/44 |
| 2015/0260047 A1 * | 9/2015 | Gieras | B64D 15/12 416/95 |
| 2015/0303369 A1 * | 10/2015 | Haden | B64D 15/163 416/39 |
| 2015/0316032 A1 * | 11/2015 | Drack | F03D 7/0296 416/1 |

FOREIGN PATENT DOCUMENTS

| | | |
|---|---|---|
| EP | 0939028 A2 | 9/1999 |
| EP | 1908927 A1 | 4/2008 |
| EP | 2180183 A1 | 4/2010 |
| EP | 2202408 A2 | 6/2010 |
| EP | 2246559 A2 | 11/2010 |
| EP | 2374010 A1 | 10/2011 |
| EP | 2652937 A1 | 10/2013 |
| WO | 9400342 A1 | 1/1994 |
| WO | 2010069534 A1 | 6/2010 |
| WO | 2012079619 A1 | 6/2012 |
| WO | 2012122669 A1 | 9/2012 |
| WO | 2014007655 A2 | 1/2014 |

OTHER PUBLICATIONS

Watlow Flexible Heaters, product information, retrieved from website URL httos://www.watlow.com/products/heaters/ht_flex.cfm (2 pgs.).

Maestrello, L., "Measurement and Analysis of the Response Field of Turbulent Boundary Layer Excited Panels," Journal of Sound and Vibration, vol. 2, Issue 3, Jul. 1965, pp. 270-292.

Schewe, G., "Reynolds—number effects in flow around more-or-less bluff bodies," Journal of Wind Engineering and Industrial Aerodynamics 89 (2001) pp. 1267-1289.

Agarwal, A. et al., "Broadband Noise From the Unsteady Flow in a Slat Cove," 42nd AIAA Aerospace Sciences Meeting and Exhibit, Jan. 5-8, 2004, Reno, NV (12 pgs).

Graziani, R. A., et al., An Experimental Study of Endwall and Airfoil Surface Heat Transfer in a Large Scale Turbine Blade Cascade, Journal for Engineering for Power, ASME Digital collections, Apr. 1, 1980, 11 pages, 257-267, vol. 102, Issue 2.

Delery, Jean M., Shock wave/turbulent boundary layer interaction and its control, Progress in Aerospace Sciences, ScienceDirect, 1985, pp. 209-280, vol. 22, Issue 4.

Kramer et al., "Drag Reduction Experiments Using Boundary Layer Heating", AIAA 1990-0134, pp. 1-12, Jan. 1999.

European Search Report and Written Opinion issued in connection with corresponding EP Application No. 15164370.7-1607 dated Aug. 26, 2015.

Kelly Aerospace Thermal Systems, "Wind Turbine Ice Protection System", retrieved from http://www.kellyaerospace.com/wind_turbine_deice.html, 2011, downloaded on Sep. 1, 2015.

Watlow, "Flexible Heaters", retrieved from "http://www.watlow.com/products/heaters/ht_flex.cfm", as seen on Jun. 19, 2012, retreived from https://web.archive.org/web/20120619023457/http://www.watlow.com/products/heaters/ht_flex.cfm on Sep. 1, 2015.

* cited by examiner

SYSTEM AND METHODS FOR REDUCING WIND TURBINE NOISE

BACKGROUND

The subject matter described herein relates generally to reducing noise generated by an airfoil, and more specifically, to devices and methods for reducing noise by heating the boundary layer at the trailing edge of an airfoil.

Generally, a wind turbine includes a rotor that includes a rotatable hub assembly having multiple blades coupled thereto. The blades transform wind energy into a mechanical rotational torque that drives one or more generators via the rotor. Some known wind turbine blades may generate considerable noise during operation of the wind turbine. As a consequence, local authorities having the responsibility for granting permission for installing wind turbines may refuse to allow installation due to the noise. Alternatively, the wind turbine installation may be authorized with set maximum sound pressure levels that cannot be exceeded. For example, in some locations, issuance of installation permits for wind turbines is based on the environmental noise impact affected or potentially affected by the wind turbine. A wind turbine may be forced to run in a noise-reduced operating mode due to the noise made by the wind turbine or turbines, which in turn may decrease the annual energy production of the wind turbine.

Generally, there are two primary noise source categories on a wind turbine. These include mechanical noise, such as vibrations in the drive train and gear noise, and aerodynamic noise, which is due to aerodynamic processes on the blades. Mechanical noise generally can be reduced using known techniques to dampen or isolate mechanical vibrations in the wind turbine or by employing sound absorbing materials. Aerodynamic noise is often more difficult to reduce, and is considered to be the dominant noise source on at least some known wind turbines.

Aerodynamic noise can be divided into two main general groups. These groups include airfoil self-noise, due to interaction of air flow with the blades, and turbulent inflow noise, due to scattering of turbulent airflow fluctuations by the blades. Airfoil self-noise is further divided into various noise mechanisms, one such example being trailing edge noise. Trailing edge noise is caused by the interaction of turbulence in the boundary layer with the blade trailing edge.

The boundary layer is a very thin sheet of air lying over the surface of the blade that tends to adhere to the blade. As the blade moves, air in the boundary layer region near the leading edge flows smoothly over the streamlined shape of the blade generating a laminar flow layer. As the air continues to flow further along the chord of the blade, the thickness of this laminar flow boundary layer increases due to friction with the blade. At some distance along the chord of the blade a turbulent layer begins to form over the laminar layer. The thickness of the turbulent layer increases and the thickness of the laminar layer decreases as the air flows further along the blade. The onset of transition flow, where the boundary layer changes from laminar to turbulent is called the "transition point," and is where drag due to skin fiction becomes relatively high. This transition point tends to move forward on the chord of the blade as the speed and angle of attack of the blade increases, resulting in more drag and more noise-causing turbulence.

BRIEF DESCRIPTION

In one aspect, a method for reducing noise generated by a wind turbine is provided. The method includes measuring a reference temperature of the wind turbine, the wind turbine including a rotor blade. The method also includes regulating a trailing edge surface temperature of a trailing edge portion of the rotor blade. In addition, the method includes measuring the trailing edge surface temperature of the trailing edge portion of the rotor blade. Moreover, the method also includes regulating the trailing edge surface temperature to maintain a predetermined temperature differential between the reference temperature and the trailing edge surface temperature.

In another aspect, a method for assembling a wind turbine is provided. The wind turbine includes at least one rotor blade having a trailing edge, a leading edge, a root, and a tip located at a spanwise distance from the root. The trailing edge portion of the rotor blade is defined adjacent the trailing edge of the rotor blade. The method includes coupling a heating element to a trailing edge portion of a rotor blade. The method also includes electrically coupling a power supply to the heating element. Further, the method includes coupling a first temperature sensor to the wind turbine, wherein the first temperature sensor is configured to measure an ambient air temperature of an airflow over the rotor blade. In addition, the method includes coupling a second temperature sensor to the rotor blade, wherein the second temperature sensor is configured to measure a surface temperature of the trailing edge portion of the rotor blade. Also, the method includes coupling a controller to the wind turbine, wherein the controller is configured to maintain a predetermined temperature differential between the ambient air temperature of the airflow and the surface temperature of the trailing edge portion of the rotor blade.

In yet another aspect, a wind turbine is provided. The wind turbine includes a rotor having a hub and at least one rotor blade coupled to the hub. The at least one rotor blade includes a body having a pressure side surface, a suction side surface, a leading edge, and a trailing edge. The body further includes a trailing edge portion defined adjacent the trailing edge. The rotor blade also includes a heating element coupled to the trailing edge portion of the body. The wind turbine includes a first temperature sensor configured to measure a first surface temperature of the at least one rotor blade proximate the leading edge. In addition, the wind turbine includes a second temperature sensor configured to measure a second surface temperature of the at least one rotor blade proximate the trailing edge portion of the body. Moreover, the wind turbine includes a power supply electrically coupled to the heating element. Further, the wind turbine includes a control system coupled to the first and second temperature sensors. The control system is configured to operate the heating element by receiving a first measured surface temperature signal from the first temperature sensor and receiving a second measured surface temperature signal from the second temperature sensor. The control system actuates the power supply to achieve a predetermined temperature differential between the first surface temperature and the second surface temperature.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device," "computing device," and "controller," are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In addition, as used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power. As used herein, the term "blade" is intended to be representative of any device that provides reactive force when in motion relative to a surrounding fluid. As used herein, the term "edge" is intended to be representative of a side formed by the intersection of two things (e.g., sides, surfaces, etc.). An "edge," as used herein, may include a curved surface. As used herein, the term "leading edge" is intended to be representative of a side formed by the intersection of a pressure side and a suction side of a blade that first comes into contact with a fluid, such as air. As used herein, the term "trailing edge" is intended to be representative of a side formed by the intersection of a pressure side and a suction side of a blade downstream of the leading edge and is the last edge contacted by the fluid.

Although generally described herein with respect to a wind turbine blade, the systems and methods described herein are applicable to any type of airfoil, for example, blades used in aero engines, fan blades, aircraft wings, and/or other airfoils that generate self-noise, such as trailing edge noise.

Figure 1:
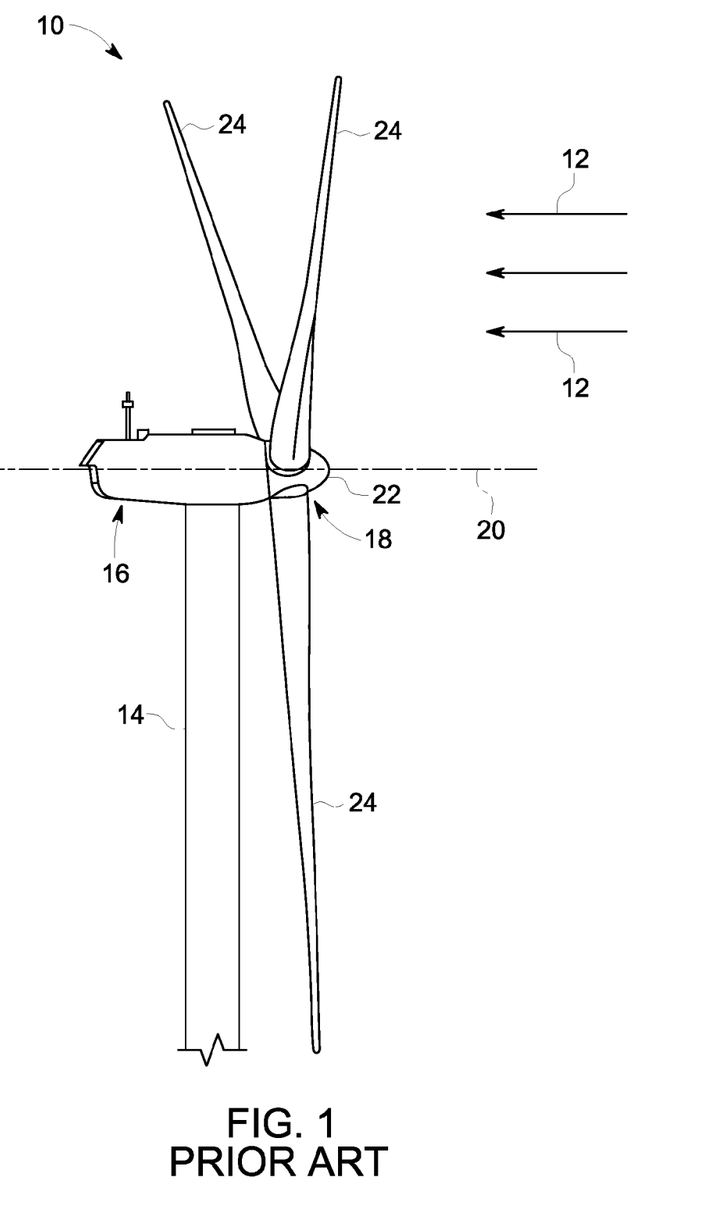
FIG. 1 is a schematic view of an exemplary wind turbine.

FIG. 1 is a schematic view an exemplary wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid, for receiving electrical power therefrom to drive operation of wind turbine 10 and/or its associated components and/or for supplying electrical power generated by wind turbine 10 thereto. Although only one wind turbine 10 is shown in FIG. 1, in some embodiments a plurality of wind turbines 10 may be grouped together, which is generally referred to as a "wind park."

In the exemplary embodiment, wind turbine 10 includes a body 16, generally referred to as a "nacelle," and a rotor 18 that is coupled to nacelle 16 for rotation with respect thereto about an axis of rotation 20. Nacelle 16 is mounted on a tower 14. However, in some embodiments, in addition or alternative to tower-mounted nacelle 16, wind turbine 10 includes nacelle 16 adjacent the ground and/or a surface of water (not shown). A height of tower 14 may be any suitable height that enables wind turbine 10 to function as described herein. Rotor 18 includes a hub 22 and a plurality of rotor blades 24, sometimes referred to as "airfoils," that extend radially outward from hub 22. Rotor blades 24 function to convert an airflow 12, or wind energy into mechanical energy, and specifically, rotational energy. Although rotor 18 is described and illustrated herein as having three rotor blades 24, rotor 18 may have any number of rotor blades 24 that enable wind turbine 10 to function as described herein. Rotor blades 24 may each have any length that enables wind turbine 10 to function as described herein. For example, in one suitable embodiment, one or more of rotor blades 24 are about 0.5 meters (m) (about 1.64 feet (ft.)) long, while in another suitable embodiment one or more of rotor blades 24 are about 50 m (about 164 ft.) long. Other examples of rotor blade 24 lengths include about 10 m (about 32.8 ft.) or less, about 20 m (about 65.6 ft.), about 37 m (about 121.4 ft.), and about 40 m (about 131.2 ft.). Still other examples include rotor blades between about 50 and about 100 meters long (about 164 ft. to about 328 ft.).

Despite how rotor blades 24 are illustrated in FIG. 1, rotor 18 may include rotor blades 24 of any shape, and may include rotor blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Moreover, wind turbine 10 may, in some suitable embodiments, be a wind turbine wherein rotor 18 generally faces upwind to harness wind energy, and/or may be a wind turbine wherein rotor 18 generally faces downwind to harness energy. Alternatively or additionally, rotor 18 may not face exactly upwind and/or downwind, but may face generally at any angle (which may be variable) with respect to a direction of the wind to harness energy therefrom.

Figure 2:
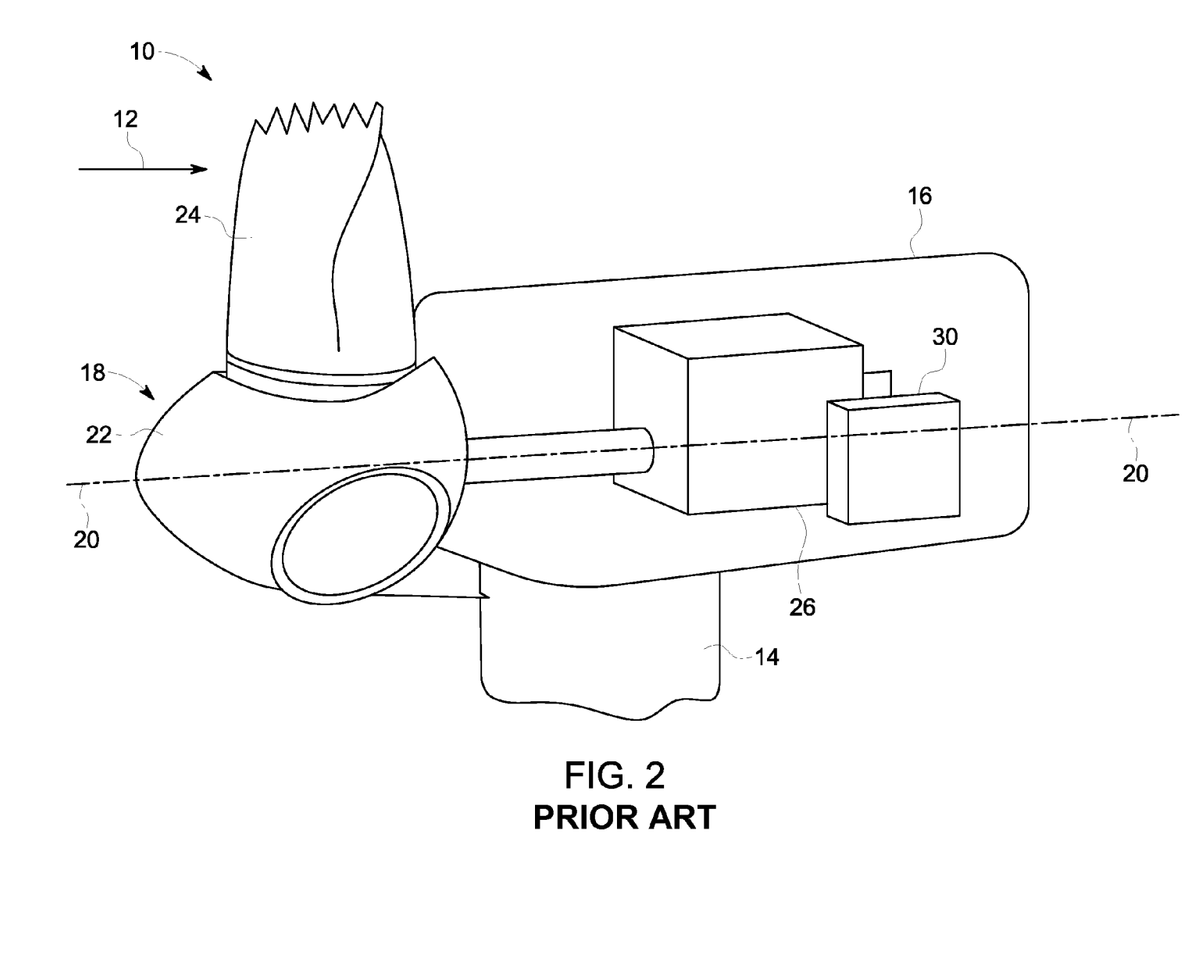
FIG. 2 is a schematic view of an exemplary nacelle that may be used with the wind turbine shown in FIG. 1.

FIG. 2 is a schematic view of nacelle 16 that may be used with wind turbine 10. Within nacelle 16, wind turbine 10 includes an electrical generator 26 coupled to rotor 18 for generating electrical power from the rotational energy generated by rotor 18. Generator 26 may be any type of generator including, but not limited to, a synchronous, three-phase, permanent magnet generator, a salient pole generator, a double-sided stator generator, and/or a doubly-fed induction generators. The torque of rotor 18 drives generator 26 to thereby generate electrical power from rotation of rotor 18.

Furthermore, in the exemplary embodiment, within nacelle 16, wind turbine 10 includes a computer control system, or controller 30 coupled to at least one of the components of wind turbine 10 for generally controlling operation of wind turbine 10 and/or some or all of the components thereof. In the exemplary embodiment, controller 30 is mounted within nacelle 16. However, additionally or alternatively, controller 30 may be remote from nacelle 16 and/or other components of wind turbine 10. Controller 30 may be used for, but is not limited to, overall system monitoring and control including, for example, without limitation, blade heating control, pitch and speed regulation, high-speed shaft and yaw brake application, yaw and pump motor application, and/or fault monitoring. Alternative distributed or centralized control architectures may be used in some suitable embodiments.

In the exemplary embodiment, controller 30 is any type of controller typically provided by a manufacturer of wind turbine 10 to control operation of wind turbine 10. In one suitable embodiment, controller 30 is a computer system that includes at least one processor (not shown) and at least one memory device (not shown) that executes executable instructions to control the operation of wind turbine 10 based at least partially on instructions from human operators. Alternatively, controller 30 is a device that enables operation of wind turbine 10 as described herein, including, without limitation, a laptop computer, a desktop computer, a distributed control system (DCS), a PLC, a Supervisory Control and Data Acquisition (SCADA) system, and a hand-held device. In some suitable embodiments, controller 30 includes a display device (not shown) configured to present information, such as, without limitation, operating conditions of wind turbine 10, to a user. Alternatively, the display device may be omitted from controller 30.

Figure 3:
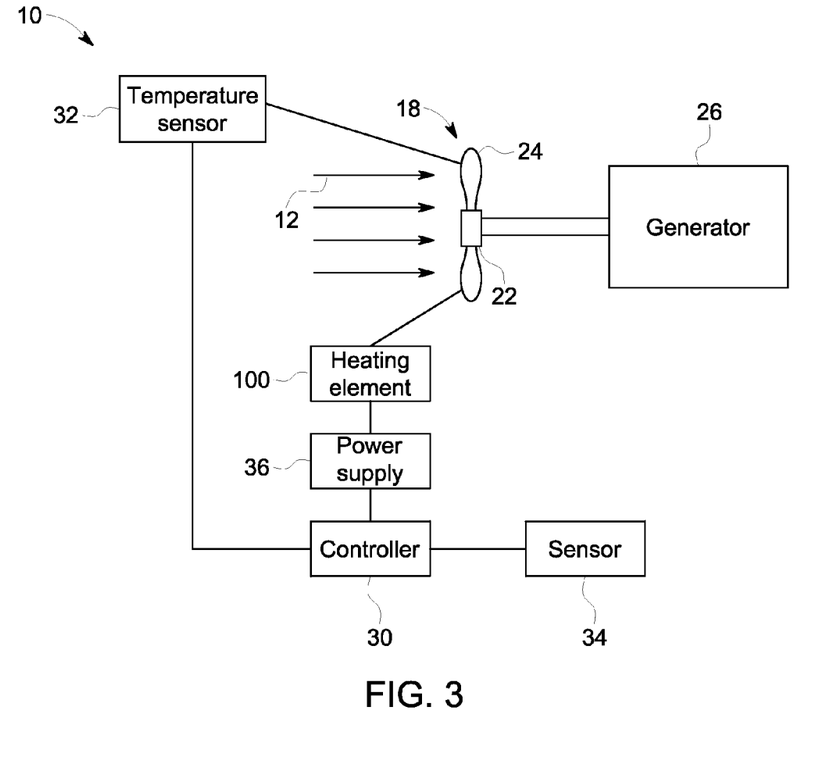
FIG. 3 is an electrical schematic diagram of the wind turbine shown in FIG. 1.

FIG. 3 is an electrical schematic diagram of wind turbine 10. In the exemplary embodiment, wind turbine 10 includes at least one temperature sensor 32 coupled substantially flush to a corresponding rotor blade 24 for measuring a reference temperature, for example, without limitation, a reference temperature of rotor blade 24. Alternatively, temperature sensor 32 can be coupled to any part of wind turbine 10 that enables temperature sensor 32 to function as described herein, for example, without limitation, to nacelle 16, hub 22, tower 14, etc. The reference temperature refers to, for example, without limitation, a surface temperature of a component of wind turbine 10 positioned away from a heating element (not shown in FIG. 3) coupled to wind turbine 10, such as a surface in the vicinity of a leading edge of a leading edge portion (not shown in FIG. 3) of rotor blade 24 in contact with airflow 12. In the exemplary embodiment, temperature sensor 32 is coupled in electronic data communication to controller 30 for sending temperature measurement signals to controller 30 for processing thereof. Temperature sensor 32 may be any suitable temperature sensor, for example, an electronic thermometer, a resistance temperature detector (RTD), a thermocouple, etc., having any suitable location within rotor blade 24 that enables wind turbine 10 to function as described herein.

Also, in the exemplary embodiment, wind turbine 10 includes at least one sensor 34 configured to measure ambient air temperature. The ambient air temperature refers to the temperature of the air surrounding rotor blade 24, and more specifically, the temperature of airflow 12 over rotor blade 24. Sensor 34 may be any suitable sensor having any suitable location within or remote to wind turbine 10, such as, but not limited to, electronic thermometers. Sensor 34 is coupled in electronic data communication to controller 30 for sending ambient air temperature measurement signals to controller 30 for processing thereof.

Wind turbine 10 may also include one or more other sensors (not shown) coupled to one or more components of wind turbine 10 and/or the electrical load, whether such component(s) are described or illustrated herein, for measuring parameters of such component(s) and/or for measuring other ambient conditions. Such other sensor(s) may include, but are not limited to, sensors configured to measure any ambient condition, any operational parameter of any wind turbine component, displacement, yaw, pitch, moments, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether such component, location, and/or parameter is described and/or illustrated herein, and may be used to derive other measurements, e.g., without limitation, viscosity.

Moreover, in the exemplary embodiment, a power supply 36 is coupled in electronic data communication to controller 30 such that controller 30 controls the operation of power supply 36. Power supply 36 may be configured to supply electrical power via stored energy and/or energy extracted from the rotational inertia of rotor 18. Although other energy sources may be used, in some suitable embodiments, power supply 36 includes hydraulic accumulators, electrical generators, capacitors, and/or batteries. Power supply 36 may be located anywhere within, on, adjacent to, and/or remote from wind turbine 10. In one suitable embodiment, power supply 36 is configured to store energy that is extracted from the rotational inertia of rotor 18 and/or other auxiliary energy sources such as, but not limited to, an auxiliary wind turbine (not shown) coupled to wind turbine 10, solar panels (not shown), and/or hydro-power installations (not shown).

Further, in the exemplary embodiment, controller 30 is configured to receive measurement signals from the plurality of temperature sensors 32 and the ambient air temperature sensor 34. In addition, controller 30 is configured to generate a differential temperature value between the reference temperature and a heated or trailing edge surface temperature measured on rotor blades 24. Further, controller 30 is configured to control power supply 36 to supply power to or to stop the supply of power to a device, such as, for example, a heating element 100 while wind turbine 10 is in service.

Figure 4:
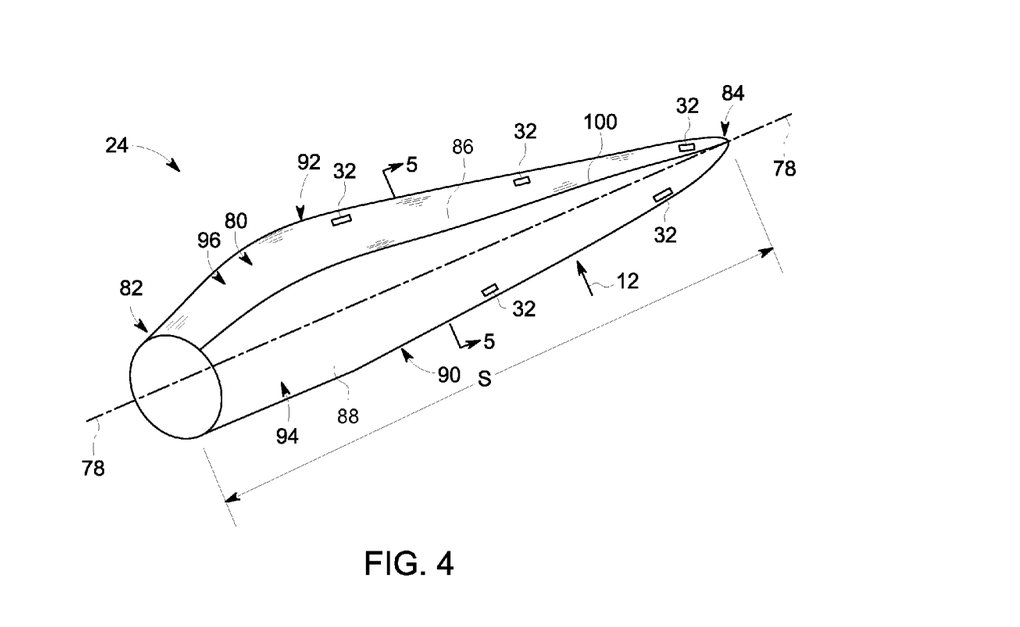
FIG. 4 is a perspective view of an exemplary rotor blade that may be used with the wind turbine shown in FIG. 1.

FIG. 4 is a perspective view of one of rotor blades 24 that may be used with wind turbine 10 (shown in FIG. 1). In the exemplary embodiment, rotor blade 24 includes a body 80 that extends along a central axis 78 between a root 82 that couples to hub 22 (shown in FIGS. 1-3) and a tip 84, thereby defining a span S. Body 80 includes a pressure side surface 86 and a suction side surface 88. Pressure side surface 86 and suction side surface 88 each extend between a leading edge 90 and a trailing edge 92. Leading edge 90 and trailing edge 92 are each formed by an intersection between pressure side surface 86 and the suction side surface 88. Body 80 includes a leading edge portion 94, which includes a portion of body 80 generally adjacent leading edge 90, and a trailing edge portion 96, which includes a portion of body 80 generally adjacent trailing edge 92.

In the exemplary embodiment, rotor blade 24 includes at least one heating element 100 coupled to trailing edge portion 96. Heating element 100 may be coupled to one or more of pressure side surface 86 and suction side surface 88. Heating element 100 is electrically coupled to power supply 36 (shown in FIG. 3) for providing the necessary electrical power to produce thermal energy. When powered, heating element 100 radiates thermal energy to enable a temperature of blade 24 proximate heating element 100 to be increased with respect to an ambient temperature. In the exemplary embodiment, heating element 100 can be configured to operate independently from other heating elements 100 (not shown) coupled to other rotor blades 24. In addition, in some suitable embodiments, rotor blade 24 may include more than one heating element 100 and is preferably provided with a sufficient number of heating elements 100 to provide a predetermined coverage area for trailing edge portion 96 of rotor blade 24.

In the exemplary embodiment, heating element 100 is similar to those heating pads used in de-ice and anti-ice systems for various airfoils and may include various electrical heating elements known in the art. For example, without limitation, heating element 100 may be a commercially available resistive heating element formed as a heating pad that employs a laminate structure in which a flexible expanded graphite foil (not shown) is an electrical and heat conducting layer disposed between an outer heat conducting layer (not shown) and an electrically insulating layer (not shown). In the exemplary embodiment, heating element 100 has one or more temperature sensors 32 embedded within heating element 100 to provide a temperature signal to controller 30.

Figure 5:
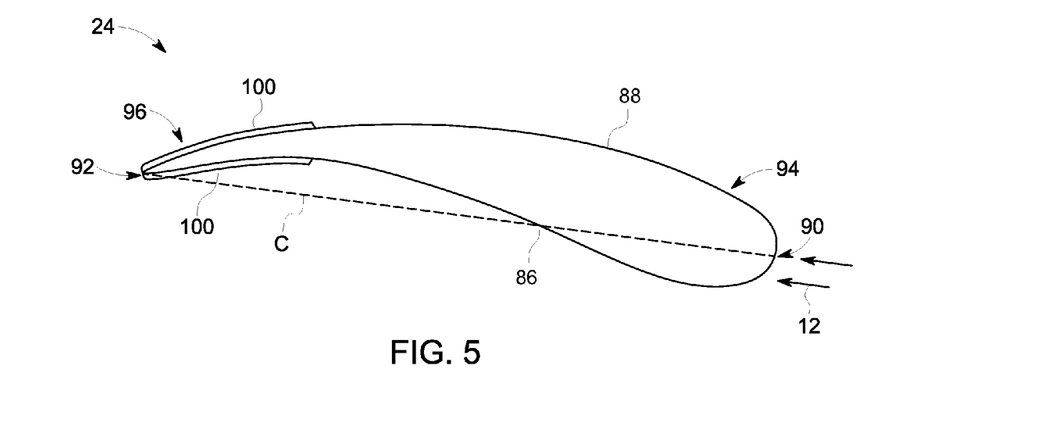
FIG. 5 is a cross-sectional view of the rotor blade shown in FIG. 4.

FIG. 5 is a cross-sectional view of one of rotor blades 24. In the exemplary embodiment, heating element 100 is bonded to or is a component of trailing edge portion 96 of blade 24, including both pressure side surface 86 and suction side surface 88. Alternatively, as described above, heating element 100 may be coupled to only one of pressure side surface 86 and suction side surface 88. In the exemplary embodiment, at least one heating element 100 is coupled substantially flush to pressure side surface 86 and at least one heating element 100 is coupled substantially flush to suction side surface 88. In the exemplary embodiment, each of heating elements 100 extend from trailing edge 92 a length in the range between approximately 2.5% to approximately 50% of a chord length C of rotor blade 24. In one suitable embodiment, heating elements 100 extend from trailing edge 92 including a range between approximately 5% to approximately 15% of chord length C of rotor blade 24. Furthermore, with reference to FIG. 4, each of heating elements 100 extend from tip 84 toward root 82 a distance in the range between approximately 20% to approximately 100% of span S of rotor blade 24. In one suitable embodiment, heating elements 100 extend from tip 84 toward root 82 in a range between approximately 25% to approximately 40% of span S of rotor blade 24.

Described herein are methods for reducing the trailing edge noise generated by an airfoil, for example, without limitation, rotor blades 24. The methods described facilitate reducing a skin friction of rotor blades 24 locally at trailing edge portion 96 by heating a portion of one or more of pressure side surface 86 and suction side surface 88, and thus the local boundary layer (not shown) of airflow 12 over rotor blades 24. Heating the boundary layer of airflow 12 results in a reduction of turbulent kinetic energy in airflow 12 proximate trailing edge portion 96, and thus a reduction in radiated trailing edge noise. In addition, the methods facilitate reducing the dependency of wind turbine operators on noise-reduced operations (NRO), which results in a net gain of annual energy production.

Figure 6:
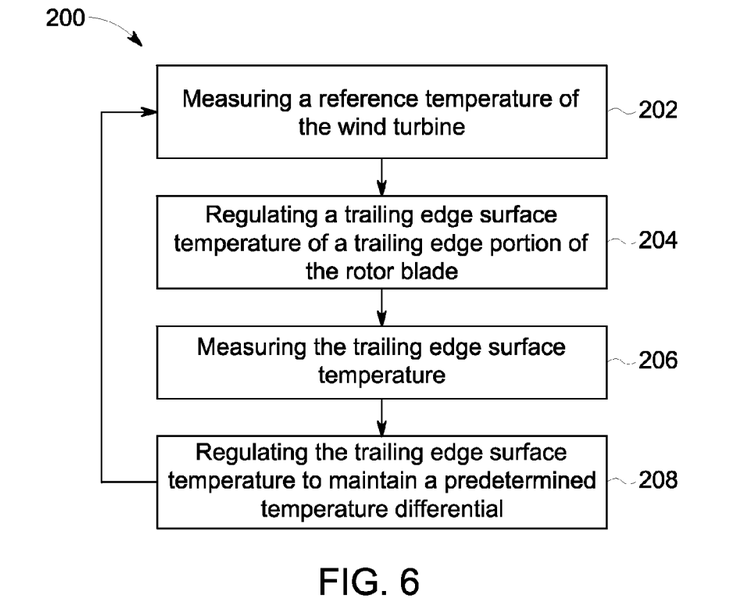
FIG. 6 is a flowchart illustrating an exemplary feedback loop or closed-loop method for reducing noise generated by the wind turbine shown in FIG. 1.

FIG. 6 is a flowchart illustrating an exemplary feedback loop or closed-loop method 200 for reducing noise generated by a wind turbine, such as, but not limited to, wind turbine 10 (shown in FIGS. 1-3). Referring to FIGS. 1-4 and 6, method 200 includes measuring 202 a reference temperature $T_{ref}$, for example, the surface temperature $T_{ref}$ in the vicinity of the leading edge of rotor blade 24, for example, using one of temperature sensors 32 as the ambient temperature sensor 34. Reference temperature $T_{ref}$ is used by controller 30 as a baseline boundary layer temperature of airflow 12. Controller 30, which controls power supply 36, actuates power supply 36, which is electrically coupled to heating element 100, causing heating element 100 to change temperature 204, such that heating element 100 is changed to a temperature above reference temperature $T_{ref}$. As heating element 100 increases in temperature, trailing edge portion 96 of rotor blades 24, including a portion of one or more of pressure side surface 86 and suction side surface 88, increases in temperature creating a temperature differential $T_{diff}$ between leading edge portion 94 and trailing edge portion 96 of rotor blades 24. Alternatively or in addition, actuation of power supply 36 may cause heating element 100 to decrease in temperature.

In operation, as airflow 12 flows across rotor blades 24, a temperature of the boundary layer $T_{bl}$ proximate heating element 100 increases. Increasing boundary layer temperature $T_{bl}$ causes a local temperature of airflow 12 to increase, resulting in a reduced density of airflow 12. As the density of airflow 12 is reduced, the kinematic viscosity ($\mu/\rho$) of airflow 12 is increases with a subsequent reduction of the local Reynolds number. The Reynolds number is calculated by the equation:

$$Re = \rho V L / \mu,\qquad\text{Eq. (1)}$$

where L=characteristic length, or chord width C of rotor blade 24,
V=velocity of airflow 12,
$\rho$=airflow 12 density, and
$\mu$=airflow 12 dynamic viscosity.

The skin friction of rotor blades 24 is proportional to the Reynolds number Re. Thus, as the temperature of airflow 12 is increased at the boundary layer due to heating of trailing edge portion 96, airflow 12 density $\rho$ decreases, and dynamic viscosity $\mu$ increases resulting in the decreased Reynolds number Re. As the Reynolds number Re is decreased, the skin friction is decreased. This results in a reduction in the production of turbulence in airflow 12 if heating element 100 is positioned downstream of the transition point, i.e., where the boundary layer of airflow 12 changes from laminar to turbulent. Additionally, decreasing the Reynolds number Re results in reducing or delaying the transition of the boundary layer from laminar to turbulent flow if heating element 100 is applied in the region of the transition point, thereby resulting a reduction in the production of turbulence in airflow 12 as the turbulent boundary layer will contain less energy, i.e., has had less time to develop. Because reduction of turbulence occurs proximate trailing edge portion 96 of rotor blades 24, it results in a lowering of trailing edge noise because, as described above, trailing edge noise is caused by the interaction of airflow 12 turbulence in the boundary layer with rotor blade trailing edge 92.

In the exemplary embodiment, method 200 also includes measuring 206 a trailing edge surface temperature $T_{te}$ of trailing edge portion 96, i.e. measuring a temperature of heating element 100, and therefore the temperature of the boundary layer $T_{bl}$ of airflow 12 at heating element 100. Controller 30 calculates temperature differential $T_{diff}$ between leading edge portion 94 (at Tref) and trailing edge portion 96 (at $T_{te}$) of rotor blades 24 in real-time, taking substantially continuous temperature measurements and calculating substantially continuous temperature differentials $T_{diff}$ in a feedback loop. Controller 30 regulates 208 second temperature $T_{te}$ of trailing edge portion 96 of rotor blade 24 to maintain a predetermined temperature differential $T_{diff}$ between reference temperature $T_{ref}$ of rotor blade 24 and trailing edge surface temperature $T_{te}$ of the heated trailing edge portion 96 of the rotor blade 24. More specifically, controller 30 regulates the supply of power from power supply 36 to heating element 100 in real-time to maintain a predefined $T_{diff}$.

In the exemplary embodiment, method 200 operates in a feedback loop or closed-loop manner such that following regulation 208 of the trailing edge portion 96 temperature $T_{te}$, the controller measures uses regulated temperature $T_{te}$ and reference temperature $T_{ref}$ to maintain predetermined temperature differential $T_{diff}$. This feedback loop continues throughout implementation of the thermal boundary layer to reduce trailing edge noise.

In operation, as temperature differential $T_{diff}$ between the surface temperature $T_{ref}$ of, for example, a leading edge portion 94, and trailing edge surface temperature $T_{te}$ of trailing edge portion 96 of rotor blades 24 increases, the resulting trailing edge noise of rotor blades 24 decreases due to reduced skin friction. Also, as temperature differential $T_{diff}$ increases, the amount of energy supplied by power supply 36 to heating elements 100 increases, which results in a reduction of annual energy production (AEP) of wind turbine 10. Operation of wind turbine 10, however, without implementation of a thermal boundary layer can result in wind turbine 10 being forced to run in an NRO mode, which also decreases the AEP of wind turbine 10. The AEP losses associated with different wind turbines operating in an NRO mode versus a heating boundary layer operation can vary. In one example, operating wind turbine 10 by thermal control of a boundary layer with a temperature differential $T_{diff}$ in the range between about 5 degrees Celsius (° C.) (41 degrees Fahrenheit (° F.)) and about 40° C. (104° F.) is expected to result in an AEP net gain in the range between about 1.7% and about 2.8% compared to operating wind turbine 10 in an NRO mode.

Figure 7:
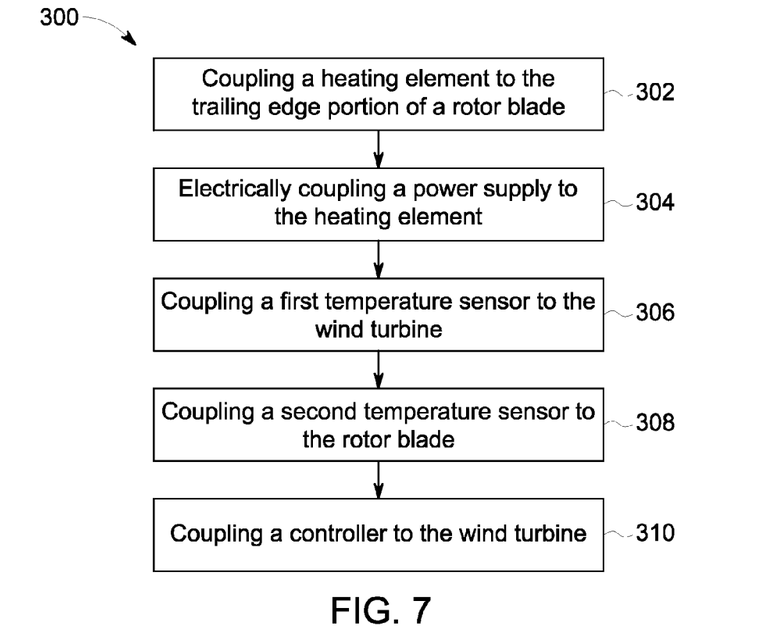
FIG. 7 is a flowchart illustrating an alternative feedback loop or closed-loop method for reducing noise generated by the wind turbine shown in FIG. 1.

FIG. 7 is a flowchart illustrating a method of assembling wind turbine 10 (shown in FIGS. 1-3). Referring to FIGS. 1-4 and 7, Wind turbine 10 include at least one rotor blade 24 having trailing edge 92, leading edge 90, root 82, and tip 84 located at spanwise distance S from the root. Wind turbine 10 further includes trailing edge portion 96 defined adjacent trailing edge 92 of rotor blade 24. Method 300 includes coupling 302 heating element 100 to trailing edge portion 96 of rotor blade 24. Method 300 also includes electrically coupling 304 power supply 36 to heating element 100 to facilitate decreasing the skin friction of trailing edge portion 96 of rotor blade 24. The skin friction is reduced by controller 30 actuating power supply 36 to supply electrical power to heating element 100, thereby causing heating element 100 to increase in temperature over the reference temperature of rotor blade 24. As heating element 100 increases in temperature, trailing edge portion 96 of rotor blade 24, including a portion of one or more of pressure side surface 86 and suction side surface 88, increases in temperature, thereby creating temperature differential $T_{diff}$ between leading edge portion 94 and trailing edge portion 96 of rotor blades 24.

Method 300 also includes coupling 306 temperature sensor 34 to wind turbine 10 for measuring an ambient air temperature $T_{amb}$ of airflow 12, i.e. temperature of airflow 12 over rotor blade 24. Ambient air temperature $T_{amb}$ is used by controller 30 as a baseline boundary layer temperature of airflow 12. As airflow 12 flows across rotor blade 24, boundary layer temperature $T_{bl}$ proximate heating element 100 increases, facilitating reducing the production of turbulence near trailing edge 92, which results in lowering the trailing edge noise.

Furthermore, method 300 includes coupling 308 temperature sensor 32 to rotor blade 24 for measuring trailing edge surface temperature $T_{te}$ of trailing edge portion 96 of rotor blade 24, i.e., heating element 100, which is substantially similar to boundary layer temperature $T_{bl}$ of airflow 12 at heating element 100. Method 300 also includes coupling 310 controller 30 to wind turbine 10. In the exemplary embodiment, controller 30 calculates temperature differential $T_{diff}$ between ambient temperature $T_{amb}$ and trailing edge surface temperature $T_{te}$ of rotor blades 24 in real-time. Controller 30 regulates the supply of power from power supply 36 to heating element 100 in real-time to maintain a predefined $T_{diff}$, thereby reducing trailing edge noise of rotor blades 24.

The methods, apparatus, and systems described herein facilitate reducing the trailing edge noise generated by airfoils by heating the boundary layer locally at the trailing edge of the airfoil. Specifically, the methods, apparatus, and systems described herein facilitate increasing the temperature of the trailing edge portion of an airfoil to facilitate reducing the skin friction associated with the airfoil, therefore reducing or delaying the transition of the boundary layer from laminar to turbulent flow. It is the boundary layer interaction with the trailing edge of an airfoil is the primary source of wind turbine noise. Therefore, the methods, apparatus, and systems described herein facilitate reducing the dependency of wind turbine operators on noise-reduced operations, thus resulting in a net gain of annual energy production.

An exemplary technical effect of the methods, systems, and apparatus described herein includes at least one of: (a) heating a trailing edge portion of a rotor blade to a temperature above a temperature of the leading edge of the airfoil to facilitate decreasing a skin friction of the trailing edge of the airfoil; (b) increasing the temperature of the boundary layer of airflow over the rotor blade to facilitate reducing the density and the kinematic viscosity of the airflow, an in turn, the local Reynolds number; and (c) decreasing trailing edge noise associated with the airfoil due to a turbulent airflow over the trailing edge of the airfoil by reducing the production of turbulence at the trailing edge.

Exemplary embodiments of a wind turbine implementing a thermal boundary layer and methods for operating the same are described above in detail. The methods, systems, and apparatus are not limited to the specific embodiments described herein, but rather, components of the systems and apparatus, and/or steps of the methods may be utilized independently and separately from other components and/or steps described herein. For example, the heating elements and methods may also be used in combination with other airfoils and methods, and are not limited to practice with only the wind turbine blades and systems as described herein. Rather, the exemplary embodiment can be implemented and utilized in connection with many other airfoil applications.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for reducing noise generated by a wind turbine, said method comprising:
   measuring a reference temperature of the wind turbine, the wind turbine having a rotor blade, wherein the reference temperature comprises a leading edge surface temperature of a leading edge portion of the rotor blade;
   regulating a trailing edge surface temperature of a trailing edge portion of the rotor blade;
   measuring the trailing edge surface temperature; and
   regulating the trailing edge surface temperature to maintain a predetermined temperature differential between the reference temperature and the trailing edge surface temperature.

2. The method in accordance with claim 1, wherein measuring the reference temperature comprises transmitting a reference temperature signal from at least one temperature sensor coupled to the wind turbine to a controller.

3. The method in accordance with claim 1, wherein measuring the trailing edge surface temperature comprises transmitting a trailing edge surface temperature signal from at least one temperature sensor coupled to the trailing edge portion of the rotor blade to a controller.

4. The method in accordance with claim 1, wherein regulating the trailing edge surface temperature comprises actuating a power supply to supply power to a heating element coupled to the trailing edge portion of the rotor blade.

5. A method for reducing noise generated by a wind turbine, said method comprising:

measuring a reference temperature of the wind turbine, the wind turbine having a rotor blade, wherein the reference temperature comprises a leading edge surface temperature of a leading edge portion of the rotor blade;

regulating a trailing edge surface temperature of a trailing edge portion of the rotor blade; measuring the trailing edge surface temperature; and regulating the trailing edge surface temperature to maintain a predetermined temperature differential between the reference temperature and the trailing edge surface temperature, wherein regulating the trailing edge surface temperature comprises actuating a power supply to supply power to a heating element coupled to the trailing edge portion of the rotor blade, wherein regulating the trailing edge surface temperature to maintain a predetermined temperature differential comprises:

calculating a temperature difference value between the reference temperature and the trailing edge surface temperature using a controller; and regulating the supply of power from the power supply to the heating element using the controller.

6. The method in accordance with claim 5, wherein measuring the trailing edge surface temperature comprises transmitting to the controller a trailing edge surface temperature signal from at least one temperature sensor coupled to the heating element.

7. The method in accordance with claim 5, wherein regulating the supply of power from the power supply to the heating element comprises maintaining the predetermined temperature differential between the reference temperature and the trailing edge surface temperature in a range between 5 degrees Celsius (° C.) and 40° C.

8. A method for assembling a wind turbine, the wind turbine including at least one rotor blade having a trailing edge, a leading edge, a root, and a tip located at a spanwise distance from the root, the wind turbine further including a trailing edge portion defined adjacent the trailing edge of the rotor blade, said method comprising:

coupling a heating element to the trailing edge portion of the rotor blade;

electrically coupling a power supply to the heating element;

coupling a first temperature sensor to the leading edge portion of the rotor blade, wherein the first temperature sensor is configured to measure a leading edge surface temperature of the leading edge portion of the rotor blade;

coupling a second temperature sensor to the trailing edge portion of the rotor blade, wherein the second temperature sensor is configured to measure a surface temperature of the trailing edge portion of the rotor blade; and coupling a controller to the wind turbine, wherein the controller is configured to maintain a predetermined temperature differential between the ambient air temperature of the airflow and the surface temperature of the trailing edge portion of the rotor blade.

9. The method in accordance with claim 8, wherein coupling a heating element to a trailing edge portion of tire rotor blade comprises one or more of the following:

coupling a first heating element to a suction side surface of the trailing edge portion of the rotor blade; and coupling a second heating element to a pressure side surface of the trailing edge portion of the rotor blade.

10. The method in accordance with claim 8, wherein coupling a heating element to a trailing edge portion of the rotor blade comprises coupling the heating element to the trailing edge portion of the rotor blade such that it extends from the tip toward the root a spanwise distance that includes a range between 20% and 100% of a span of the rotor blade.

11. The method in accordance with claim 10, wherein coupling the heating element to the trailing edge portion of the rotor blade comprises coupling the heating element to the trailing edge portion of the rotor blade such that it extends from the tip toward the root a spanwise distance that includes a range between 25% and 40% of the span of the rotor blade.

12. The method in accordance with claim 8, wherein coupling a heating element to a trailing edge portion of the rotor blade comprises coupling the heating element to the trailing edge portion of the rotor blade such that it extends from the trailing edge toward the leading edge a chordwise distance that includes a range between 2.5% and 50% of a chord length of the rotor blade.

13. The method in accordance with claim 12, wherein coupling the heating element to the trailing edge portion of the rotor blade comprises coupling the heating element to the trailing edge portion of the rotor blade such that it extends from the trailing edge toward the leading edge a chordwise distance that includes a range between 5% and 15% of the chord length of the rotor blade.

14. The method in accordance with claim 8, wherein the controller is configured to maintain the differential between the ambient air temperature of the airflow and the surface temperature of the trailing edge portion of the rotor blade in a range between 5 degrees Celsius (° C.) and 40° C.

15. A wind turbine system comprising:

a rotor comprising a hub and at least one rotor blade coupled to said hub, said at least one rotor blade comprising:

a body comprising a pressure side surface, a suction side surface, a leading edge, and a trailing edge, said body further comprising a trailing edge portion defined adjacent said trailing edge; and a heating element coupled to said trailing edge portion; a first temperature sensor configured to measure a first surface temperature of said at least one rotor blade proximate said leading edge; a second temperature sensor configured to measure a second surface temperature of said at least one rotor blade proximate said trailing edge portion;

a power supply electrically coupled to said heating element; and a control system coupled to said first temperature sensor and said second temperature sensor, said control system configured to operate said beating element by receiving a first measured surface temperature signal from said first temperature sensor, receiving a second measured surface temperature signal from said second temperature sensor, and actuating said power supply to achieve a predetermined temperature differential between the first surface temperature and the second surface temperature.

16. The wind turbine system in accordance with claim 15, wherein said heating element comprises a laminated resistive heating element.

17. The wind turbine system in accordance with claim 15, wherein said second temperature sensor is embedded within said heating element.

18. The wind turbine system in accordance with claim 15, wherein said heating element comprises a first heating element coupled to said pressure side surface, and a second heating element coupled to said suction side surface.

19. The wind turbine system in accordance with claim 15, wherein said body further comprises a root and a tip located a span wise distance from said root, said heating element extending from said tip toward said root a spanwise distance that includes a range between 20% and 100% of a span of said body.

20. The wind turbine system in accordance with claim 15, wherein said heating element extends from said trailing edge toward said leading edge a chord wise distance that includes a range between approximately 2.5% and 50% of a chord length of said body.

* * * * *